United States Patent
Hore et al.

(10) Patent No.: US 9,269,936 B2
(45) Date of Patent: Feb. 23, 2016

(54) APPARATUS AND METHOD FOR PROVIDING SAFETY MEASURES DURING GAS RELEASE FROM A VEHICLE BATTERY AND INSTALLATION SPACE FOR A VEHICLE BATTERY

(71) Applicants: Robert Bosch GmbH, Stuttgart (DE); Samsung SDI Co., Ltd., Yongin-si, Gyeonggi-do (KR)

(72) Inventors: Sarmimala Hore, Stuttgart (DE); Joachim Fetzer, Bad-Ditzenbach (DE); Ralf Angerbauer, Moeglingen (DE); Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 171 days.

(21) Appl. No.: 14/155,458

(22) Filed: Jan. 15, 2014

(65) Prior Publication Data
US 2014/0205867 A1    Jul. 24, 2014

(30) Foreign Application Priority Data

Jan. 18, 2013   (DE) .......................... 10 2013 200 732

(51) Int. Cl.
*H01M 2/12*   (2006.01)
*H01M 10/0525*   (2010.01)

(52) U.S. Cl.
CPC ........ *H01M 2/1264* (2013.01); *H01M 10/0525* (2013.01); *H01M 2220/20* (2013.01); *Y02T 10/7005* (2013.01); *Y02T 10/7011* (2013.01)

(58) Field of Classification Search
None
See application file for complete search history.

(56) References Cited

U.S. PATENT DOCUMENTS

| | | | | |
|---|---|---|---|---|
| 2010/0173192 A1* | 7/2010 | Toia | ..................... | H01M 2/0257 429/164 |
| 2010/0183914 A1* | 7/2010 | Toia | ..................... | H01M 10/052 429/178 |
| 2015/0017489 A1* | 1/2015 | Visconti | ................. | H01G 11/06 429/57 |

* cited by examiner

*Primary Examiner* — Gregg Cantelmo
(74) *Attorney, Agent, or Firm* — Maginot, Moore & Beck LLP

(57) ABSTRACT

An apparatus for providing safety measures during gas release from a vehicle battery, such as a damaged lithium-ion rechargeable battery, arranged in a volume space having an opening includes at least one shroud element. The shroud element is configured to expand into the volume space by being filled with a gas such that, upon expansion of the shroud element, openings in the shroud element are enlarged and shroud element contents are discharged into the volume space through the enlarged openings in the shroud element. The apparatus further includes a device that, upon reception of a trigger signal, is configured to fill the shroud element at least partially with carbon dioxide gas such that carbon dioxide gas is discharged into the volume space as contents of the shroud element. An installation space includes the apparatus and a method is implemented to provide safety measures during gas release from the vehicle battery.

12 Claims, 3 Drawing Sheets form a battery module, a degassing channel of this type is
APPARATUS AND METHOD FOR PROVIDING SAFETY MEASURES DURING GAS RELEASE FROM A VEHICLE BATTERY AND INSTALLATION SPACE FOR A VEHICLE BATTERY This application claims priority under 35 U.S.C. §119 to patent application no. DE 10 2013 200 732.9 filed on Jan. 18, 2013 in Germany, the disclosure of which is incorporated herein by reference in its entirety.

BACKGROUND

The disclosure relates to an apparatus and to a method for providing safety measures during gas release from a vehicle battery, in particular from a damaged lithium-ion rechargeable battery for hybrid or electric vehicles. The disclosure further relates to an installation space for a vehicle battery.

In electric and hybrid electric motor vehicles, galvanic cells are used as energy stores. In this context, lithium-ion rechargeable batteries (also called lithium-ion batteries) are used in particular as the vehicle battery providing the energy required for the drive. These, and also in principle other galvanic cells, have a number of problems. Disturbances, such as the occurrence of high electric currents, overcharging of the vehicle battery during the charging operation or high external temperatures, can thus lead to what is termed thermal runaway and as a consequence thereof to overheating of the battery cells of the vehicle battery. Flammable gas, for example ethane, methane and other hydrocarbon gases, forms in the affected battery cells, this gas formation bringing about a pressure increase inside the battery cells.

Safety vents or air vents arranged at the top end of the housing of a battery cell are known in the prior art as apparatuses for providing safety measures during gas release from a vehicle battery. These safety vents are formed in such a manner that they open with an increasing pressure inside the battery cell and therefore make it possible for the gas mixture to be released (also referred to as release of gas hereinbelow) from the battery cell. What are termed degassing channels are known in the prior art as further apparatuses for providing safety measures during gas release from a vehicle battery. When a plurality of battery cells are connected together to form a battery module, a degassing channel of this type is arranged above the air vents of the battery cells and is connected in this way to the individual battery cells. Here, the degassing channel carries released gases away from the vehicle to the atmosphere via a discharge opening, as a result of which the vehicle occupants in particular are protected from the released gases.

However, the use of such degassing channels leads to the structural disadvantage that electronic components, particularly those required for the battery management, cannot be arranged on the battery modules. The arrangement of the electronic components on the battery modules has proved to be structurally expedient, however. A further disadvantage of the use of such degassing channels is that the throughput of released gas is often unsatisfactory. Thus, gas released from damaged battery cells can often not be dissipated quickly enough via the degassing channel, as a result of which the internal pressure in the degassing channel rises rapidly. As a result of the increased internal pressure, the air vents of previously undamaged battery cells too are opened or broken open, as a result of which the released gas also penetrates into these, previously undamaged battery cells, and the latter can therefore likewise be damaged. In particular, the rising internal pressure in the battery cells owing to the released gas can lead to a cascade of explosions, which can not only destroy the vehicle battery, but also represent a safety risk for the vehicle and its occupants.

Against this background, the disclosure is based on the object of improving the dissipation of gas released from damaged battery cells and of at least partially neutralizing released gases, while avoiding the aforementioned disadvantages.

SUMMARY

What is proposed for achieving the object is an apparatus for providing safety measures during gas release from a vehicle battery, in particular from a damaged vehicle battery, in particular from a damaged lithium-ion rechargeable battery for hybrid or electric vehicles, wherein the vehicle battery is arranged in a volume space having an opening, which apparatus is characterized by at least one shroud element, which can be filled with a gas, has openings and is designed to expand into the volume space by being filled with a gas, in such a manner that, upon expansion of the shroud element, the openings in the shroud element are enlarged and the contents of the shroud element are discharged into the volume space through the enlarged openings in the shroud element, and by at least one device for filling the shroud element, which is designed, upon reception of a trigger signal, to fill the shroud element at least partially with carbon dioxide gas, such that carbon dioxide gas is discharged into the volume space at least partially as contents of the shroud element. According to the disclosure, when gas release is detected, the at least one shroud element expands into the volume space within a few seconds, preferably within about 10 to 750 ms. Here, the volume space is formed in particular by the installation space for the vehicle battery, which advantageously has a discharge opening. In particular, the installation space for a vehicle battery can be the boot or a recess, for example the spare wheel recess beneath the floor covering of the boot, of a motor vehicle. In this respect, the shroud element is advantageously in the form of a plastic bag, preferably of a nylon bag. It is particularly preferable for the shroud element together with the device for filling the shroud element to be configured in the manner of an airbag used for protecting occupants in vehicles. According to an advantageous embodiment of the disclosure, the openings in the shroud element are a multiplicity of crossed slots, preferably in the form of an "X" and/or "+", which widen upon expansion of the shroud element.

The disclosure is based on the understanding that gas released from a vehicle battery, in particular a lithium-ion rechargeable battery, arranged in an installation space—but in principle also gas released from a different galvanic cell—can be dissipated particularly efficiently by displacement from the installation space into the atmosphere, where the displacement is effected by an airbag-like shroud element with openings which enlarge during the expansion of the shroud element, in that, upon detection of gas release, the shroud element expands, preferably in pulses, into the installation space by being filled with gas, particularly advantageously with carbon dioxide gas ($CO_2$), and the gas escapes from the shroud element into the volume space through the enlarged openings in the shroud element, if appropriate together with further solids which are preferably suitable for neutralizing gas released from the vehicle battery. As a first safety measure provided, the gas released from the vehicle battery is in this case advantageously displaced by the expansion of the at least one shroud element and also the carbon dioxide gas escaping from the at least one shroud element, and discharged to the atmosphere through an opening in the installation space. The use of carbon dioxide gas moreover affords the advantage that, as a further safety measure, a fire fanned by overheating of battery cells can be extinguished by means of the escaping carbon dioxide gas. As a further safety measure, the escaping carbon dioxide gas advantageously cools the damaged vehicle battery, as a result of which thermal runaway of further battery cells can be prevented. It is advantageous that the apparatus according to the disclosure can be used without a degassing channel. Owing to the absence of a degassing channel, the air vents of the battery cells can be arranged laterally on the battery cells, as a result of which electronic components, such as in particular components for the battery management system, can advantageously be arranged on the battery cells.

Carbon dioxide gas used or produced by the device for filling the shroud element for filling the shroud element is preferably discharged through the enlarged openings in the shroud element at least partially as contents of the shroud element. According to one embodiment variant of the disclosure, the device used for filling the shroud element here is a pressure accumulator preloaded with carbon dioxide gas. In addition to the expansion of the shroud element, the carbon dioxide gas discharged from the shroud element also contributes to the displacement of gas released from the vehicle battery. In addition, the carbon dioxide gas escaping from the shroud element advantageously cools the damaged battery cells of the vehicle battery. This advantageously makes it possible to prevent thermal runaway of further battery cells and to reduce the risk of fire and/or explosion posed by the damaged battery cells. In addition, a fire which has broken out in the volume space is advantageously extinguished by the carbon dioxide gas.

According to a further particularly preferred embodiment of the disclosure, calcium oxide and/or magnesium oxide is discharged into the volume space as contents of the shroud element. According to one embodiment variant, powdery calcium oxide and/or magnesium oxide is introduced into the at least one shroud element. If the shroud element expands when filled with gas so that the openings in the shroud element widen, the powdery calcium oxide and/or magnesium oxide escapes from the shroud element, i.e. the calcium oxide and/or the magnesium oxide is discharged into the volume space as contents of the shroud element. In the volume space, the calcium oxide and/or the magnesium oxide advantageously reacts with hydrogen fluoride gases released from the vehicle battery. The calcium oxide and/or the magnesium oxide in this process advantageously neutralizes hydrogen fluoride gases. This neutralization of the hydrogen fluoride gases represents a further safety measure provided by the apparatus according to the disclosure.

According to a further advantageous embodiment of the disclosure, calcium carbonate and/or magnesium carbonate is discharged into the volume space as contents of the shroud element. The discharge of calcium carbonate ($CaCO_3$) and/or magnesium carbonate ($MgCO_3$) in this respect advantageously improves the neutralization of the hydrogen fluoride gases. In addition, it is provided according to the disclosure that calcium carbonate and/or magnesium carbonate instead of calcium oxide and/or magnesium oxide is discharged from the shroud element into the volume space for neutralizing the hydrogen fluoride gases.

According to a further advantageous aspect of the disclosure, the device for filling the shroud element is a gas generator with an ignition device and a medium to be ignited. A gas generator of this type can be configured in the manner of a gas generator which is used for filling airbags used for occupant protection in motor vehicles. The rapid expansion times of the shroud element, of only a few milliseconds, are advantageous in such an embodiment. In particular, a gas generator of this type is designed to allow the gas to escape into the shroud element at a speed of up to 400 km/h, and therefore to fill the shroud element virtually immediately or in pulses. A solid propellant is preferably provided as the medium to be ignited.

Advantageously, the medium to be ignited consists at least partially of calcium carbonate and/or magnesium carbonate. In particular, it is also provided in this respect that the medium to be ignited is calcium carbonate or magnesium carbonate or a mixture of calcium carbonate and magnesium carbonate. The medium to be ignited is preferably provided in the form of pellets. Calcium carbonate and/or magnesium carbonate as the medium to be ignited affords the advantage that, upon ignition, carbon dioxide gas forms, which is discharged into the volume space in particular as contents of the shroud element when the shroud element has reached its maximum expansion and the openings in the shroud element have enlarged owing to the expansion of the shroud element. As already mentioned, the discharge of carbon dioxide gas into the volume space advantageously displaces or carries away gas released from the vehicle battery from the volume space, and moreover provides a fire extinguishing agent and also a coolant. The use of calcium carbonate and/or magnesium carbonate as solid propellant moreover affords the advantage that, upon ignition by the ignition device of the gas generator, powdery calcium oxides or magnesium oxides are formed in particular as a further reaction product in addition to carbon dioxide gas. According to a further particularly advantageous embodiment of the disclosure, residues of calcium carbonate and/or magnesium carbonate additionally remain after ignition. These oxides and/or carbonates are advantageously discharged into the volume space via the enlarged openings in the at least one shroud element. The release into the volume space in this respect ensures the aforementioned advantageous neutralization of gaseous hydrogen fluorides released by the damaged vehicle battery.

According to a further particularly preferred embodiment of the disclosure, the volume space is formed by an installation space for a vehicle battery, wherein at least the at least one shroud element and the at least one device for filling the shroud element are arranged in the installation space, and wherein the installation space has an opening with a gas-permeable closure element. In particular, it is provided that a shroud element together with a device for filling the shroud element, preferably together with a gas generator, is embedded as a module at least partially in the inner wall of the installation space. The closure element is advantageously in the form of a gas-permeable diaphragm, the diaphragm preventing solids from escaping from the volume space formed by the installation space. Calcium fluoride or magnesium fluoride which has formed during the neutralization of hydrogen fluoride gas therefore advantageously remains in the volume space formed by the installation space.

What is furthermore proposed for achieving the object mentioned in the introduction is an installation space for a vehicle battery, in particular for a lithium-ion rechargeable battery for hybrid or electric vehicles, having at least one gas-permeable opening, wherein a volume space for the arrangement of a vehicle battery is formed by the installation space, and the installation space has an apparatus according to the disclosure for providing safety measures during gas release from a vehicle battery. The opening is preferably arranged facing away from the passenger compartment, and therefore vehicle occupants are afforded even better protection against the released gases. A closure device, preferably a diaphragm, is advantageously introduced into the opening in the installation space, through which closure device gas can escape or can be displaced and which closure device prevents solids, in particular calcium fluoride and/or magnesium fluoride, from escaping from the volume space formed by the installation space.

What is moreover proposed for achieving the object mentioned in the introduction is a method for providing safety measures during gas release from a vehicle battery, in particular from a damaged lithium-ion rechargeable battery for hybrid or electric vehicles, wherein the vehicle battery is arranged in a volume space having an opening, wherein, upon reception of a trigger signal, at least one device for filling a shroud element with a gas fills at least one shroud element having openings at least partially with carbon dioxide gas, wherein the shroud element expands into the volume space by being filled with gas, the openings in the shroud element enlarge owing to the expansion of the shroud element and the contents of the shroud element are discharged into the volume space through the enlarged openings in the shroud element, wherein carbon dioxide gas is discharged into the volume space at least partially as contents of the shroud element. According to an advantageous development of the method, calcium oxide and/or magnesium oxide and/or calcium carbonate and/or magnesium carbonate is discharged into the volume space as further contents of the shroud element. It is advantageous that the shroud element occupies almost the entire free volume space, but at least 20% to 70%, at the time of maximum expansion. The volume space is in this case preferably formed by the installation space for a vehicle battery.

BRIEF DESCRIPTION OF THE DRAWINGS

Further advantageous details, features and embodiment details of the disclosure will be explained in more detail in conjunction with the exemplary embodiments shown in the figures.

DETAILED DESCRIPTION

In the exemplary embodiments shown in FIG. 1 to FIG. 4, a volume space 1, in which a vehicle battery 2 is arranged, is formed in each case by an installation space for a vehicle battery 2. The installation space is a particular embodiment for a volume space for the arrangement of a vehicle battery. To denote the installation space, the reference sign "1" is therefore used both for the installation space and the volume space formed thereby in conjunction with the exemplary embodiments of the disclosure shown in FIG. 1 to FIG. 4.

Figure 1:
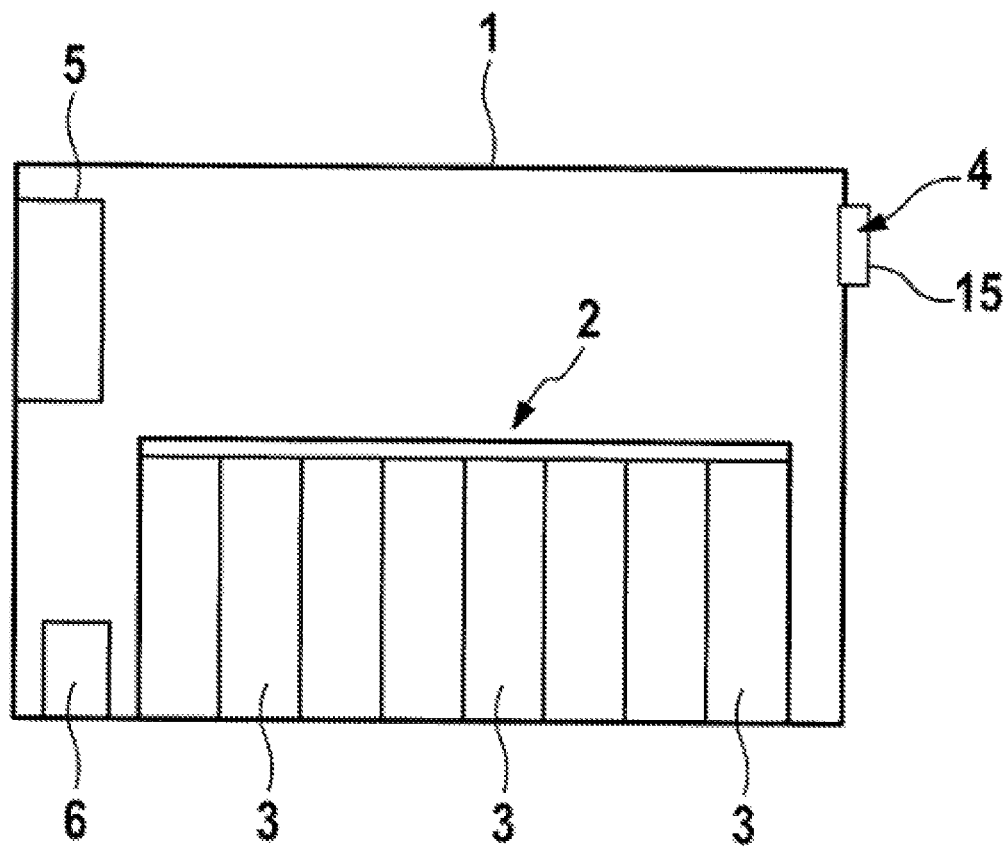
FIG. 1 shows, in a schematic illustration, an exemplary embodiment of an apparatus according to the disclosure, which is arranged in an installation space according to the disclosure for a vehicle battery.

FIG. 1 shows an installation space 1 for a vehicle battery 2. The installation space 1 here is a partial region of an electric vehicle (not shown in the figures). The vehicle battery 2 is a lithium-ion rechargeable battery with a multiplicity of interconnected battery cells 3. The battery cells 3 each have a safety vent or air vent (not shown explicitly in the figure). If gas evolves in a battery cell 3, for example on account of overheating, the internal pressure in the battery cell 3 increases, as a result of which the safety vent or the air vent opens and the gas is released into the installation space 1 through the air vent. The installation space 1 has an opening 4, which is directed away from the passenger compartment of the electric vehicle so that released gases do not penetrate into the passenger compartment via the opening 4. A diaphragm 15, which allows only gaseous substances to escape from the installation space 1, is embedded in the opening 4.

A module 5, in which a shroud element (not shown explicitly in FIG. 1) which can be filled with a gas and a device (likewise not shown explicitly in FIG. 1) for filling the shroud element with a gas are arranged, is arranged on an inner wall of the installation space 1. The device for filling the shroud element is a pressure accumulator preloaded with carbon dioxide gas. The shroud element is a plastic bag which has openings widening upon expansion of the plastic bag and which is arranged folded together in the module 5 in the manner of an airbag known from occupant protection. The shroud element is designed to expand in pulses into the installation space 1 when filled with the carbon dioxide gas, in which case, with an increasing, in particular elastic expansion of the shroud element, the openings in the shroud element are enlarged and carbon dioxide gas as well as powdery magnesium carbonate is discharged into the installation space 1 as contents of the shroud element. A control device 6 is likewise arranged on the inner wall of the installation space 1, and is connected to a plurality of sensors (not shown explicitly in FIG. 1) arranged on the safety vents of the battery cells 3. A sensor of this type supplies a signal (detection signal) to the control device 6 when the air vent of a battery cell 3 opens. In addition, the control device 6 is connected to a gas sensor (not shown explicitly in FIG. 1), which is designed to supply a signal (detection signal) to the control device 6 when gas is released from a battery cell 3. The control device 6 is designed in particular to control the pressure accumulator arranged in the module 5, where the control device 6 transmits a trigger signal to the pressure accumulator, whereupon the pressure accumulator allows carbon dioxide gas to escape into the shroud element, and therefore fills the shroud element. The provision of safety measures when gas is released from a vehicle battery in particular will be explained in more detail hereinbelow with reference to the exemplary embodiment shown in FIG. 2.

Figure 2:
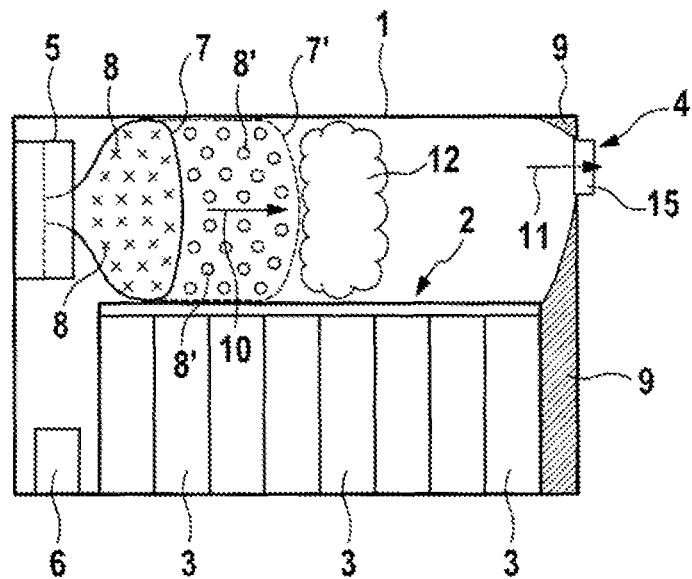
FIG. 2 shows, in a schematic illustration, a further exemplary embodiment of the disclosure with an expanding shroud element and contents escaping from the shroud element.

FIG. 2 shows an installation space 1 for a lithium-ion rechargeable battery as a vehicle battery 2 having an apparatus according to the disclosure. To improve the displacement of released gas from the installation space 1, the installation space 1 is partially lined with an internal cladding 9. If gases are released, for example in the case of thermal runaway of a battery cell 3 of the vehicle battery 2, the following method steps are carried out in particular according to the disclosure: a sensor (not shown explicitly in FIG. 2) arranged on a battery cell 3 and connected to a control device 6 detects the release of gas, whereupon the control device 6 transmits a trigger signal to a gas generator (not shown explicitly in FIG. 2) arranged in the module 5. The gas generator has an ignition device and calcium carbonate ($CaCO_3$) present in the form of pellets as solid propellant. As a likewise advantageous alternative, it would be possible to use magnesium carbonate ($MgCO_3$) as solid propellant. The reception of the trigger signal has the effect that the ignition device ignites the solid propellant. This forms carbon dioxide gas ($CO_2$), which is discharged into the shroud element 7, 7', and therefore the shroud element 7, 7' is filled as it were in pulses with the carbon dioxide gas within a few milliseconds. A chemical reaction further forms powdery calcium oxide, which likewise propagates inside the shroud element 7, 7'. The continuous line shown in FIG. 2 represents the shroud element 7 at a point in time $t_1$, for example 90 ms after the control device 6 has received the detection signal from a sensor. The dashed line shows the same shroud element 7' at a later point in time $t_1+t$, for example 96 ms after the control device 6 has received the detection signal. In this case, the shroud element 7, 7' is a plastic bag having a multiplicity of openings 8 measuring a few micrometers. At the point in time $t_1$, the openings 8 here are so small that they are not suitable for allowing the contents of the shroud element 7 to escape, or allow only small quantities of the contents to escape. Particularly owing to elastic expansion of the shroud element 7 which sets in, the openings 8 are enlarged or the openings 8 widen, so that the contents 12 of the shroud element 7', i.e. in this case the carbon dioxide gas and the powdery calcium oxide, are discharged into the installation space 1 through the openings 8'.

Figure 3:
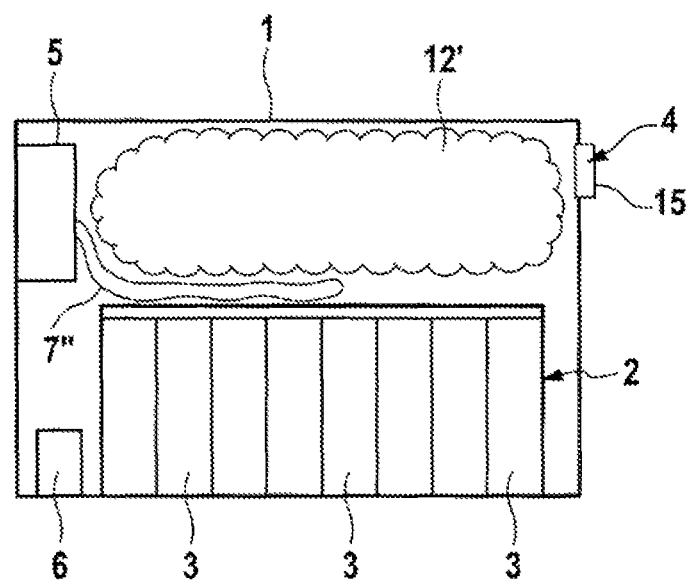
FIG. 3 shows, in a schematic illustration, a further exemplary embodiment of the disclosure with a shroud element after expansion and contents discharged from the shroud element.

Owing to the expansion of the plastic bag 7, 7' into the installation space 1, represented symbolically by the arrow 10 in FIG. 2, and also owing to the carbon dioxide gas flowing out of the openings 8' in the shroud element 7', as a safety measure provided by the apparatus according to the disclosure, the gas released from the vehicle battery 2 or from the battery cell 3 is displaced from the installation space 1 through the opening 4 in the installation space 1, which is represented symbolically by the arrow 11 in FIG. 2. In addition, the carbon dioxide gas extinguishes a fire that is present (not shown explicitly in FIG. 2), and moreover cools the battery cells 3 of the vehicle battery 2, as a result of which it is possible to prevent thermal runaway of further battery cells 3. As a further safety measure provided, powdery calcium oxide discharged from the shroud element 7' neutralizes hydrogen fluorides released from the battery cell 3. The calcium fluoride which is formed during the neutralization is advantageously prevented from escaping into the atmosphere by the closure element 15 in the opening 4 in the installation space 1. Owing to the escape of the carbon dioxide gas and of the powdery calcium oxide, the shroud element 7, 7' finally collapses, as is shown schematically in FIG. 3. In this respect, the shroud element 7'' shown in FIG. 3 is content-free to the greatest possible extent. The cloud 12' in FIG. 3 in this case symbolizes the mixture of carbon dioxide gas and powdery calcium oxide still present in the installation space 1.

Figure 4:
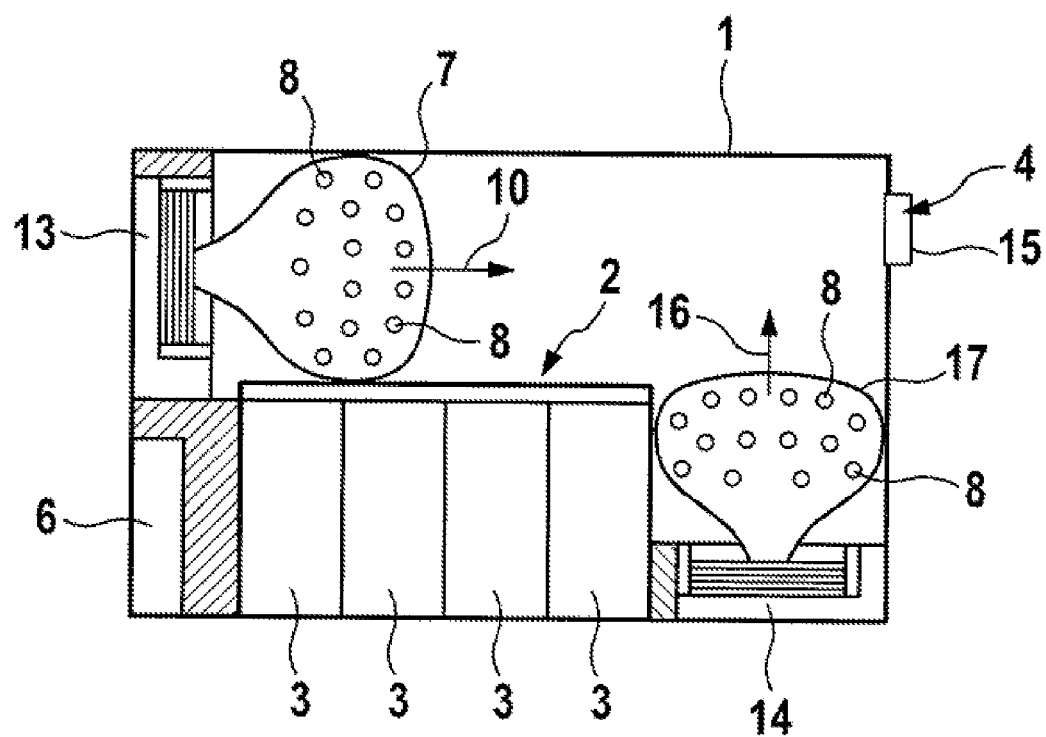
FIG. 4 shows, in a schematic illustration, a further exemplary embodiment of the disclosure with two expanding shroud elements.

FIG. 4 shows a further exemplary embodiment of the present disclosure. Here, the apparatus according to the disclosure is shown at a point in time $t_2$, for instance 120 ms after the control device 6 has received a detection signal. The apparatus according to the disclosure, which is arranged in the installation space 1, has two shroud elements 7 and 17, which can be filled with a gas and which are connected respectively to a gas generator 13 or 14 for filling with a gas. The shroud elements here have openings 8, which are enlarged upon expansion of the respective shroud element 7 and 17. The additional shroud element 17 improves the displacement of gas released from a battery cell 3, in that it prevents propagation of the gas into the free space alongside the vehicle battery 2 to the greatest possible extent or displaces gas which has flowed into this space. The control device 6 is in this case configured in such a way that it transmits the trigger signal with a slight delay, i.e. for instance 3 ms later, to the gas generator 14 than to the gas generator 13. The gas generators 13 and 14 can in this case have different solid propellants, it being provided in particular that the solid propellant of the gas generator 13 is calcium carbonate and the solid propellant of the gas generator 14 is magnesium carbonate.

As can be gathered from the exemplary embodiments explained in conjunction with FIG. 1 to FIG. 4, gas released from the vehicle battery 2 is carried away and at least partially neutralized, without the battery 2 having a degassing channel. This makes it possible to arrange electronic components, in particular components for the battery management system (BMS), at least partially on the battery cells 3, in that the air vents of the battery cells 3 are arranged on the side walls of the housing.

The exemplary embodiments shown in the figures and explained in conjunction therewith serve to explain the disclosure and do not have a limiting effect therefor.

What is claimed is:

1. An apparatus for providing safety measures during gas release from a vehicle battery arranged in a volume space having an opening, comprising:
   at least one shroud element configured to be filled with a gas, the shroud element having openings and being further configured to expand into a volume space by being filled with the gas, in such a manner that, upon expansion of the shroud element, the openings in the shroud element are enlarged and the contents of the shroud element are discharged into the volume space through the enlarged openings in the shroud element; and
   at least one device configured to fill the shroud element, the device being further configured, upon reception of a trigger signal, to fill the shroud element at least partially with carbon dioxide gas such that carbon dioxide gas is discharged into the volume space at least partially as contents of the shroud element.

2. The apparatus according to claim 1, wherein one or more of calcium oxide and magnesium oxide is discharged into the volume space as contents of the shroud element.

3. The apparatus according to claim 1, wherein one or more of calcium carbonate and magnesium carbonate is discharged into the volume space as contents of the shroud element.

4. The apparatus according to claim 1, wherein the device configured to fill the shroud element is a gas generator with an ignition device and a medium to be ignited.

5. The apparatus according to claim 4, wherein the medium to be ignited includes at least partially one or more of calcium carbonate and magnesium carbonate.

6. The apparatus according to claim 1, wherein the volume space is formed by an installation space for a vehicle battery, wherein at least the at least one shroud element and the at least one device configured to fill the shroud element are arranged in the installation space, and wherein the installation space has an opening with a gas-permeable closure element.

7. The apparatus according to claim 1, wherein the vehicle battery is configured as a damaged lithium-ion rechargeable battery for hybrid or electric vehicles.

8. An installation space for a vehicle battery, comprising:
   at least one gas-permeable opening formed in the installation space; and
   a volume space formed by the installation space and configured for the arrangement of a vehicle battery, the installation space including an apparatus configured to provide safety measures during gas release from the vehicle battery, the apparatus including:
   at least one shroud element configured to be filled with a gas, the shroud element having openings and being further configured to expand into the volume space by being filled with the gas, in such a manner that, upon expansion of the shroud element, the openings in the shroud element are enlarged and the contents of the shroud element are discharged into the volume space through the enlarged openings in the shroud element; and at least one device configured to fill the shroud element, the device being further configured, upon reception of a trigger signal, to fill the shroud element at least partially with carbon dioxide gas such that carbon dioxide gas is discharged into the volume space at least partially as contents of the shroud element.

9. The installation space according to claim 8, wherein the installation space is configured for a lithium-ion rechargeable battery for hybrid or electric vehicles.

10. A method for providing safety measures during gas release from a vehicle battery arranged in a volume space having an opening, comprising:

filling at least one shroud element having openings at least partially with carbon dioxide gas, the shroud element being filled with gas by at least one device that, upon reception of a trigger signal, is configured to fill the shroud element with the gas; and expanding the shroud element into the volume space by the filling of the shroud element with the gas, wherein the openings in the shroud element are enlarged due to the expansion of the shroud element and the contents of the shroud element are discharged into the volume space through the enlarged openings in the shroud element, and wherein the carbon dioxide gas is discharged into the volume space at least partially as contents of the shroud element.

11. The method according to claim 10, wherein one or more of calcium oxide, magnesium oxide, calcium carbonate, and magnesium carbonate is discharged into the volume space as further contents of the shroud element.

12. The method according to claim 10, wherein the vehicle battery is configured as a damaged lithium-ion rechargeable battery for hybrid or electric vehicles.

* * * * *